INVENTOR.
LESTER D. MILLER
BY M. A. Hobbs
ATTORNEY

Sept. 15, 1970        L. D. MILLER        3,528,698

TRAVEL TRAILER

Filed June 17, 1968        4 Sheets-Sheet 2

INVENTOR.
LESTER D. MILLER
BY M. A. Hobbs
ATTORNEY

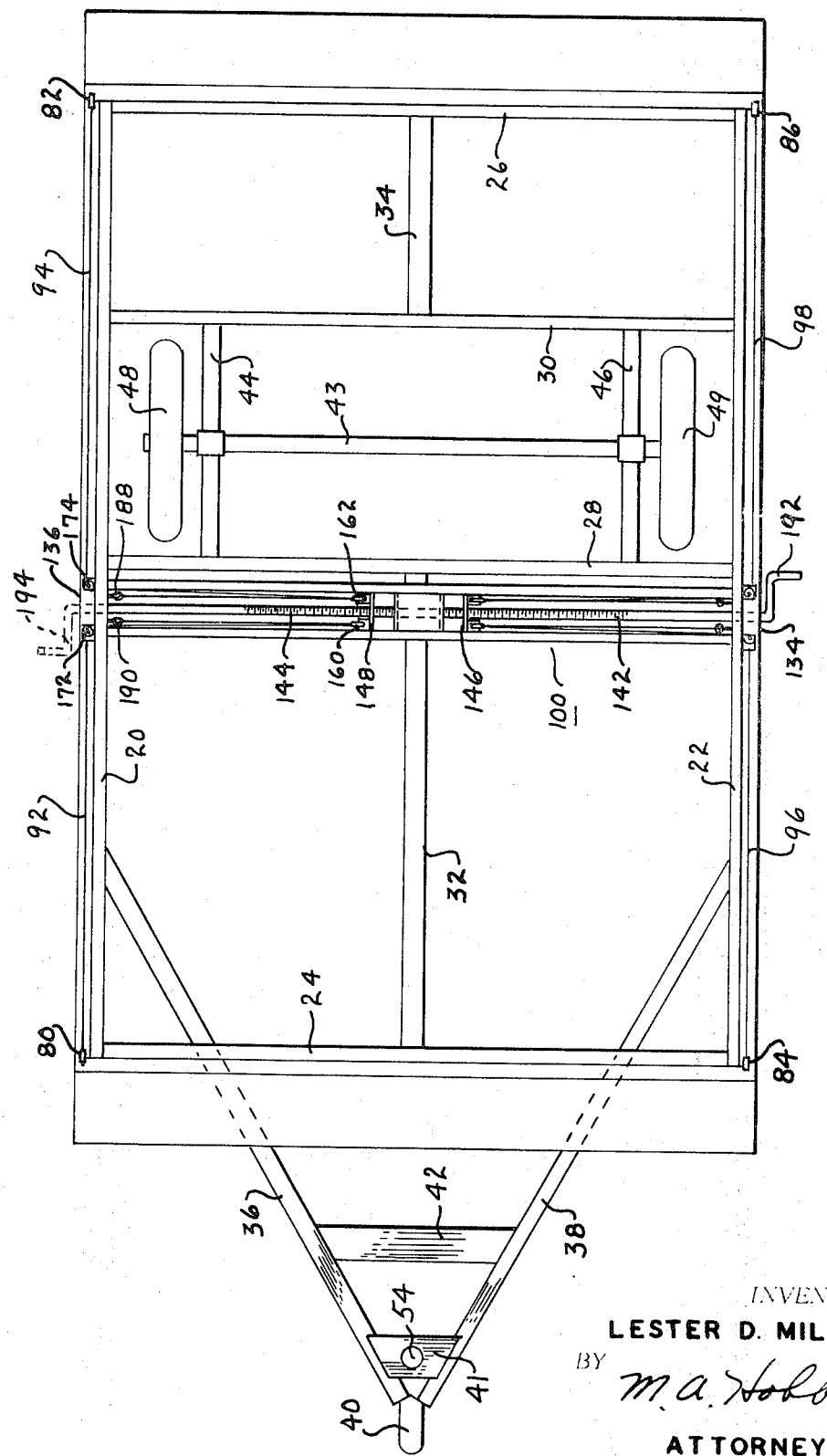

Sept. 15, 1970      L. D. MILLER      3,528,698
TRAVEL TRAILER
Filed June 17, 1968      4 Sheets-Sheet 4
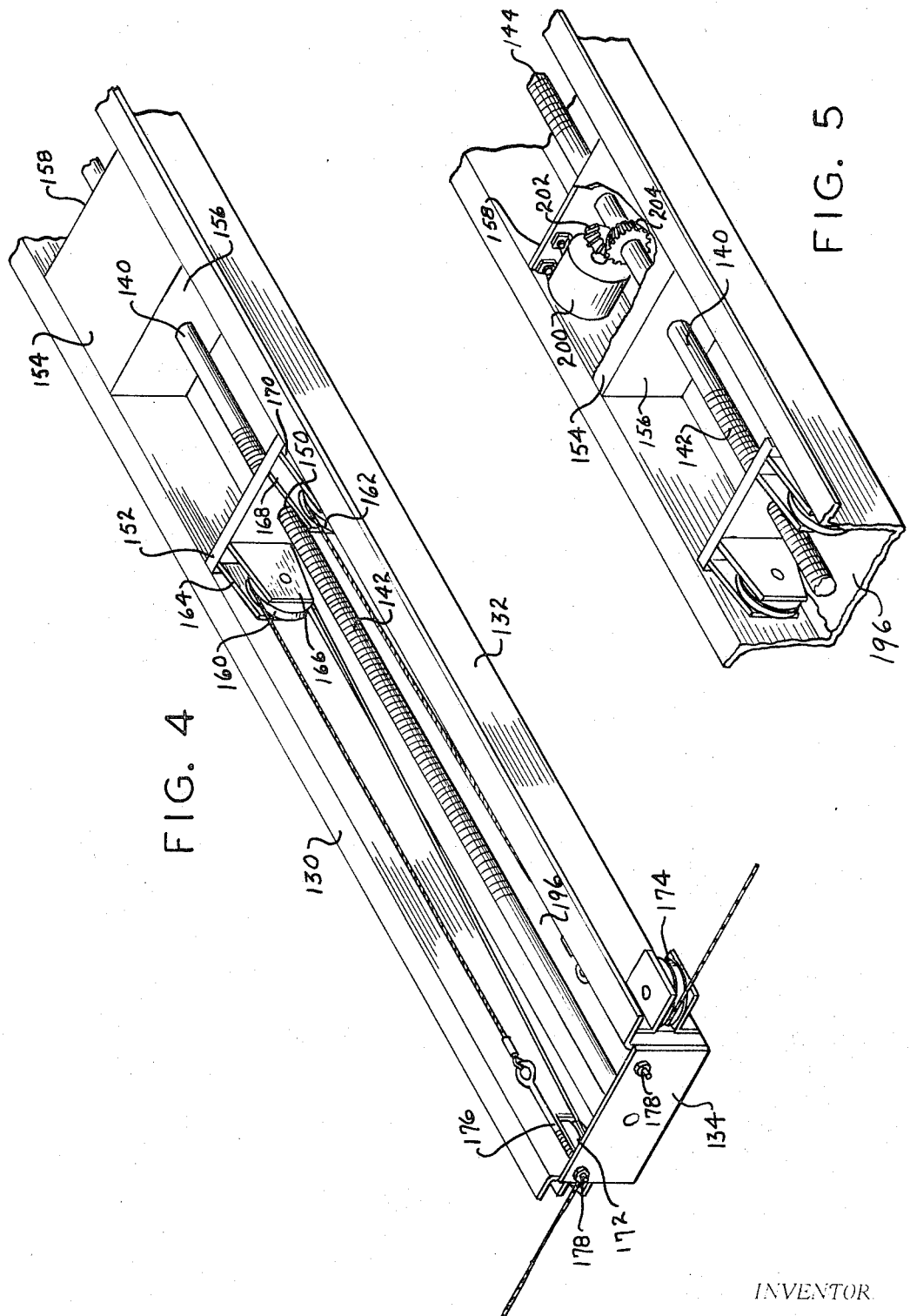
INVENTOR.
LESTER D. MILLER
BY M. A. Hobbs
ATTORNEY

United States Patent Office 3,528,698
Patented Sept. 15, 1970

3,528,698
TRAVEL TRAILER
Lester D. Miller, Ligonier, Ind., assignor to Bangor Punta Operations, Inc., New York, N.Y., a corporation of New York
Filed June 17, 1968, Ser. No. 737,778
Int. Cl. B60p 3/34
U.S. Cl. 296—27                                              7 Claims

ABSTRACT OF THE DISCLOSURE

A mechanism for raising and lowering the top of a travel trailer in which telescopic posts are mounted at the corners of the body and are operated by a screw-type mechanism having a pair of carriages thereon operable in opposite directions when the screw is rotated, and including cables connecting two of the posts to one carriage and cables connecting the other two posts to the other carriage. The screw mechanism is mounted transversely across the trailer and can be operated from either side thereof.

---

Travel trailers normally consist basically of a body mounted on two wheels and provided with foldable side wall portions and a top which can be raised for use of the trailer for living purposes and lowered for travel. When the top is lowered, the trailer has good roadability while it is being towed, and when the top is raised the body provides sufficient space for comfortable and efficient living. Various types of collapsible structures are used to form the foldable section, including hinged panels which fold inwardly between the body and top when the top is lowered, or plastic sheet material which is rolled or folded as the top is lowered. The types of mechanisms used in the past to raise and lower the top and to support it rigidly in its fully raised position, have had certain disadvantages or difficulties which rendered them unsatisfactory, including the necessity of requiring direct lifting of the top by the operator or the use of complicated mechanisms which are expensive or difficult to operate and maintain in effective operable condition. Further, a number of these prior mechanisms have operating parts which are mounted externally of the trailer body and are exposed to view, or are so placed beneath the body that they are subjected to road dust, dirt and slush, and hence require frequent service. It is therefore one of the principal objects of the present invention to provide a travel trailer having a top raised and lowered from the body and operated by a mechanism which is completely confined within the body, and which is dependable, and easy to operate and maintain in optimum operating condition.

Another object of the invention is to provide a mechanism for raising and lowering the top of a foldable travel trailer having telescopic posts at the corners of the body which retract completely within the body when the top is lowered and which are operated by a mechanism mounted in otherwise unusable space beneath the body.

Still another object of the invention is to provide a compact, versatile mechanism for raising and lowering the top of foldable travel trailers, which can be installed on foldable trailers of various sizes and designs and which can readily be adapted to the frame construction of the trailer.

A further object is to provide a mechanism for operating a foldable travel trailer of the aforesaid type which can be operated manually from either side of the trailer or which can be operated by a power driven means principally confined within the lift mechanism.

Another object of the invention is to provide a top lifting, lowering and supporting mechanism for travel trailers, which can readily be fabricated from standard materials and which is virtually trouble-free, but which can easily be serviced while the unit is in its expanded position without disassembling the parts.

Additional objects and advantages of the present invention will become apparent from the following description and accompanying drawings, wherein:

FIG. 3 is a top plan view of a portion of the frame of the trailer shown in the preceding figures, with the body removed to better illustrate the operating mechanism of the present top raising and lowering mechanism;

FIG. 4 is an enlarged perspective view of a portion of the top raising and lowering mechanism; and FIG. 5 is an enlarged, fragmentary perspective view of a modified form of the present top raising and lowering mechanism.

Figure 1:
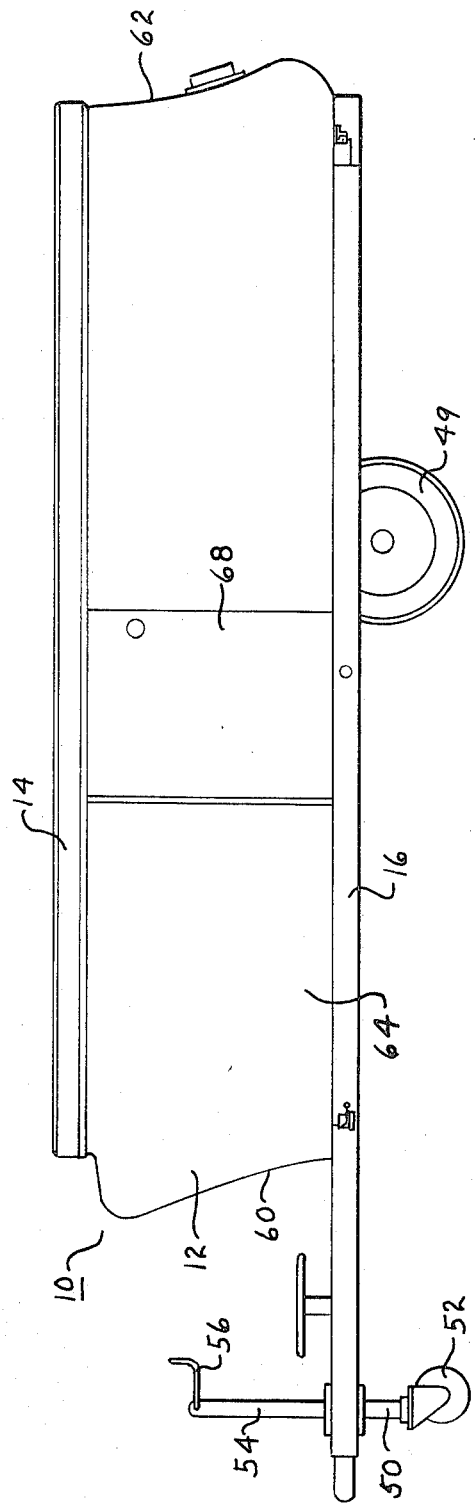
FIG. 1 is a side elevational view of the travel trailer with the top lowered onto the body in closed position.
Figure 2:
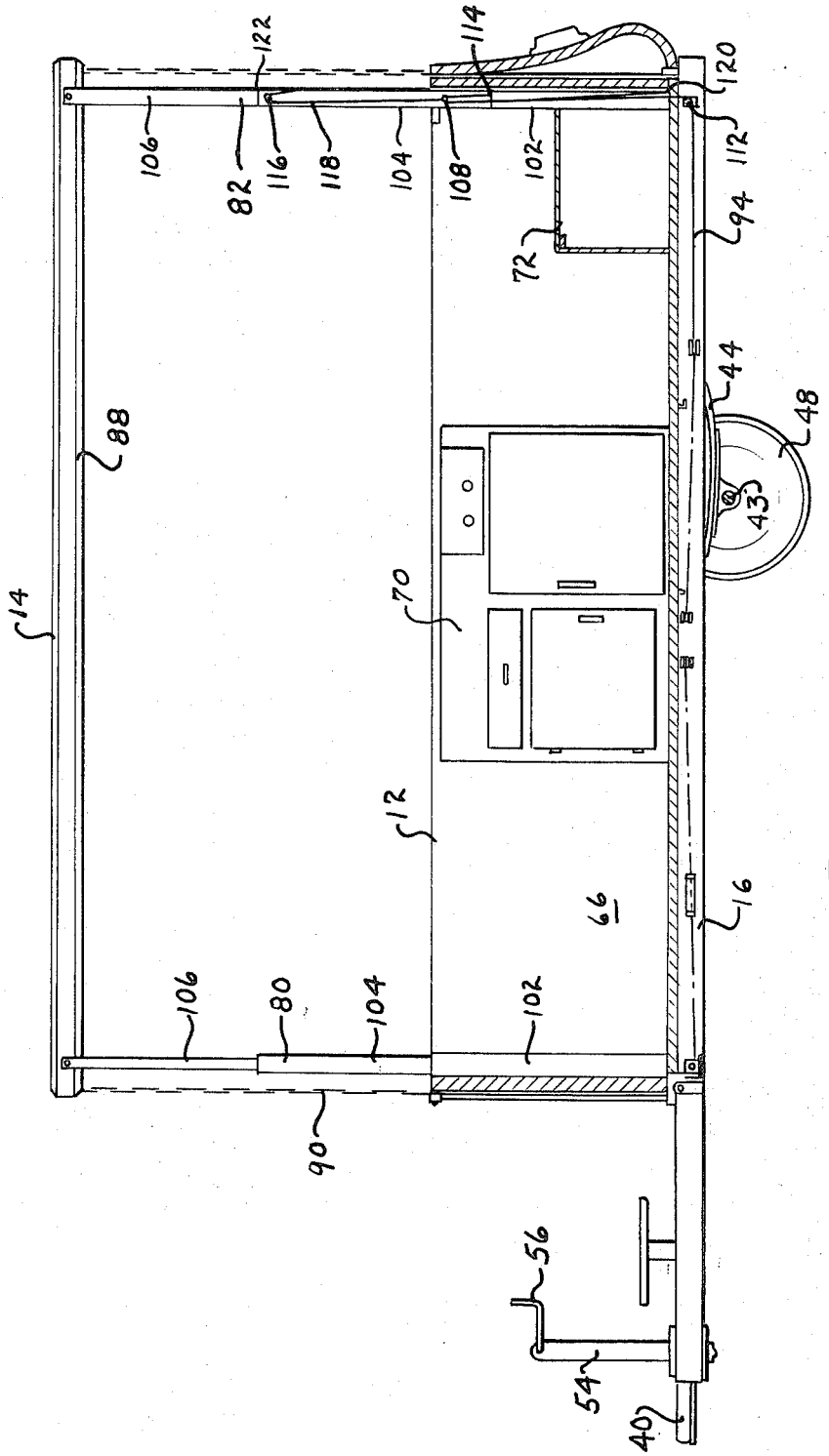
FIG. 2 is a longitudnal vertical cross sectional view of the trailer shown in FIG. 1.

Referring more specifically to the drawings, and to FIGS. 1, 2 and 3 in particular, numeral 10 designates generally the present travel trailer, 12 the body, 14 the top resting on the upper edge of the body, and 16 the frame and undercarriage which may be considered conventional for the purpose of the present description.

The frame consists of two longitudinal side members 20 and 22, end members 24 and 26, and cross members 28 and 30. Longitudinal reinforcing member 32 extends between end member 24 and cross member 28, and reinforcing member 34 extends between cross member 30 and end member 26. The tongue consists of two angularly positioned members 36 and 38 joined at their rear ends to the sides of the two members 20 and 22, respectively, and connected to one another by a hitch fixture 40 and cross members 41 and 42. The undercarriage consists of an axle 43 connected to the cross members 28 and 30 by springs 44 and 46 and having wheels 48 and 49 mounted on the ends thereof. The forward end of the frame is supported, when the trailer is disconnected from the vehicle, by a lift 50 having a wheel 52 and a mechanical jack mechanism 54 and operating handle 56. When the trailer is being towed, hitch fixture 40 is connected to a tow-bar or other fixture on the rear of the towing vehicle.

Body 12 of the trailer, illustrated in FIGS. 1 and 2, is mounted rigidly on frame 16 and has two front and rear ends 60 and 62 and sides 64 and 66, side 64 having a door 68 near the center thereof. In FIG. 2, some of the furnishings of the body are illustrated, numeral 70 designating cupboards with conventional doors and drawers, and 72 illustrating a bunk or storage compartment.

The top 14 is supported by posts 80, 82, 84 and 86, mounted in the corners of body 12, and is provided with downwardly extending sidewalls or flange 88 which seats on the upper edge of body 12 and forms an effective, water-tight seal therewith. When top 14 is in its raised position, as illustrated in FIG. 2, the space between the top of the body and the lower edge of the top is, in the present embodiment, closed by a durable plastic panel material 90 having suitable windows of flexible plastic material which are adapted to fold readily along with the foldable material 90.

The system and structure for lifting and lowering the top 14 consists of the four telescopic posts 80, 82, 84 and 86, cables 92, 94, 96 and 98, and an operating mechanism indicated generally by numeral 100. The four posts are identical to one another and are rigidly mounted in the four corners of body 12, each post consisting of a lower section 102, an intermediate section 104, which slips longitudinally into the lower section, and upper section 106, which slips longitudinally into intermediate section 104 and, with the intermediate section, slips into the lower section 102 when the post is fully retracted. The four sections are rectangular in shape, with an opening along one side extending the full length thereof. The three sections slide readily from their fully retracted position when the top is down to a substantially fully extended position when the top is up. The mechanism for moving the three sections between the fully retracted position and their fully extended position consists of a cable mounted on a series of pulleys. A pulley 108 secured to the upper end of section 102 and the main operating cable 94 passing over a pulley 112 extends over pulley 108 and is anchored at fixture 114 at the bottom of section 104. By this construction, movement of cable 94 to the right, as viewed in FIG. 2, causes section 104 to move to its extended position. A pulley 116 is mounted in the upper end of section 104, and a cable 118 anchored at one end on fixture 120 at the lower end of section 102, is trained on pulley 116 and anchored at the other end at fixture 122 at the bottom of section 106. The movement of pulley 116 with section 104 causes telescopic section 106 to become extended relative to section 104 and section 102. It is thus seen that the force applied by cable 94 is transmitted through cable 118 to the telescopic section 106. When the top is to be lowered, the weight of the top is sufficient to return the telescopic sections to their completely retracted positions, with the downward movement being controlled by the operating mechanism 100. The post and cable construction just described is shown in greater detail in U.S. Pat. No. 3,314,715. Variations in the post construction can be made, including the use of a greater or lesser number of sections.

The operating mechanism generally indicated by numeral 100 is mounted rigidly beneath the floor of the trailer between frame members 20 and 22 and consists of two longitudinal members 130 and 132 disposed in spaced parallel relation and rigidly connected to one another at their ends by end plates 134 and 136. The two members 130 and 132 may be constructed of angle iron of sufficient strength to form a rigid structure with the end plates. Mounted in the space between the two longitudinal members 130 and 132 is a shaft 140 having two threaded sections 142 and 144 on the lower and upper halves as viewed in FIG. 3. Carriages 146 and 148 are mounted on the threaded sections 142 and 144, respectively, each containing a hole 150 having threaded side walls for meshing with the threads on the respective shaft sections. Each of the carriages consists of a rectangular shaped body 152 seated in the space between the two longitudinal members 130 and 132 which form guides for the carriage to prevent the carriage from rotating when the shaft is rotated, and to assist in maintaining the carriages in direct transverse relationship to the shaft. Shaft 140 is journalled in end plates 134 and 136 and in an intermediate supporting structure 154 rigidly secured between the two longitudinal members 130 and 132 and having two vertical walls 156 and 158 through which the shaft extends and preferably is journalled.

Mounted on each carriage 146 and 148 are two sheaves 160 and 162 rotatably supported by the side members 164 and 166 for sheave 160 and side members 168 and 170 for sheave 162. Sheaves 172 and 174 are rigidly mounted on the ends of members 130 and 132, respectively. These sheaves extend through the side of the respective members and cable 96 is trained on sheaves 172 and 160 and is anchored on an anchor bolt 176 which extends through end member 134 and is adjustably secured therein by a nut 178. Cable 98 is trained on sheaves 174 and 162 and is anchored on an anchor bolt 176 which extends through the end member and is adjustably secured therein by a nut 178. Cables 94 and 92 are trained on the respective sheaves of carriage 148 and anchored to anchor bolts 188 and 190, respectively. The construction and operation of these four sheaves are identical to the construction and operation of those described in detail with reference to cables 96 and 98.

Shaft 140 is operated by a crank 192 or crank 194 removably connected to the opposite ends of the shaft. The threaded sections 142 and 144 are such that rotation of the shaft in one direction causes the carriages 146 and 148 to move toward one another and, in the other direction, to move away from one another in the space between longitudinal members 130 and 132. When the carriages move toward one another, i.e. inwardly toward the center of the mechanism, the cables are pulled inwardly, thus causing the telescopic sections of the four posts to become extended and raise the top from the position shown in FIG. 1 to the position shown in FIG. 2. When the shaft is rotated in the opposite direction, the tension on the cable is relieved, thus permitting the weight of the trailer top to telescope the posts downwardly to their contracted positions. The shaft, carriages and sheaves are enclosed between members 130 and 132 by a bottom plate 196 joined to the lower edges of those members.

In the operation of the trailer top raising and lowering system, the mechanism 100 is operated by turning either of the two cranks, causing the carriages to apply tension on cables 92, 94, 96 and 98 to extend the posts and thus lift the top. The shaft threads in the carriage hold the top in its raised position without any additional securing means and the top remains firmly in its elevated position until intentionally lowered. When the top is raised, the flexible side walls which have been folded within the top and body, become extended, enclosing the area between the elevated top and the upper edge of the body. When the top is to be lowered, cranks 192 and 194 are operated, thus causing the carriages to move toward the outer ends of mechanism 100, thereby relieving the tension on the cables and permitting the weight of the top to contract the posts and to seat it on the upper edge of the body with the flexible side walls enclosed therein. One of the advantages of the present lift mechanism is that it can be operated from either side by the use of cranks 192 and 194. These cranks may be secured permanently to the ends of the shaft or they may be removably connected thereto.

A modified form of the present invention is illustrated in FIG. 5. In this embodiment, the shaft 140 is driven by an electric motor 200 through beveled gears 202 and 204 mounted on the motor shaft and shaft 140, respectively. The motor and gears are mounted in support structure 154 and are preferably completely enclosed to avoid damage resulting from road slush, dirt and other foreign matter. The motor is of a reversible type and is controlled by a conventional switch located at some convenient place on the trailer. The operation of this modification is essentially the same as that of the first embodiment described herein, with the exception of the power drive mechanism including the motor 200.

While only two embodiments of the present trailer top lift mechanism have been described in detail herein, various other changes and modifications may be made without departing from the scope of the invention.

I claim:

1. In a trailer having a frame, a body on said frame, a top movable from a lowered position on said body to a raised position, and a plurality of extensible and contractable posts on said body for raising and supporting said top: a mechanism for operating said posts to raise and lower said top, comprising a shaft rotatably supported by said frame, a pair of carriages on said shaft threadedly engaging said shaft for movement thereon in opposite directions when said shaft is rotated, a frame having two spaced side members parallel with said shaft forming guides for said carriages, sheaves mounted on said carriages, sheaves mounted adjacent the opposite ends of said shaft, and an operating cable from each of said posts trained over one of the end sheaves and one of the carriage sheaves and anchored at a point adjacent the respective end sheaves.

2. A mechanism for operating posts of a trailer to raise and lower the top as defined in claim 1 in which said shaft extends transversely across said trailer frame.

3. A mechanism for operating posts of a trailer to raise and lower the top as defined in claim 1 in which said means for rotating said shaft includes a crank at one end of said shaft.

4. A mechanism for operating posts of a trailer to raise and lower the top as defined in claim 1 in which said means for rotating said shaft includes a crank at each end of said shaft on opposite sides of the trailer.

5. A mechanism for operating the posts of a trailer to raise and lower the top as defined in claim 1 in which said means for rotating said shaft consists of an electric motor and a power transmission means connecting said motor to said shaft.

6. A mechanism for operating the posts of a trailer to raise and lower the top as defined in claim 1 in which the trailer has four corner posts and one carriage operates the cables from two of said posts and the other carriage operates the cables from the other two of said posts.

7. A mechanism for operating posts of a trailer to raise and lower the top as defined in claim 6 in which the cables from the two posts located on one side of the trailer are connected to one carriage and the cables of the posts mounted on the other side of the trailer are connected to the other carriage.

References Cited
UNITED STATES PATENTS

| | | | |
|---|---|---|---|
| 2,055,930 | 9/1936 | Josephs | 296—23.3 |
| 2,797,124 | 6/1957 | Hauptli | 296—23.3 |

PHILIP GOODMAN, Primary Examiner

U.S. Cl. X.R.

52—66; 296—23